United States Patent
Aiken et al.

(10) Patent No.: US 6,232,921 B1
(45) Date of Patent: May 15, 2001

(54) METHOD AND SYSTEM FOR ADAPTIVE SIGNAL PROCESSING FOR AN ANTENNA ARRAY

(75) Inventors: Richard Thomas Aiken, Convent Station; Roger David Benning, Long Valley; Dirck Uptegrove, Mendham, all of NJ (US)

(73) Assignee: Lucent Technologies Inc., Murray Hill, NC (US)

( * ) Notice: Subject to any disclaimer, the term of this patent is extended or adjusted under 35 U.S.C. 154(b) by 0 days.

(21) Appl. No.: 09/481,567

(22) Filed: Jan. 11, 2000

(51) Int. Cl.[7] ........................................ G01S 3/16
(52) U.S. Cl. ............................................. 342/383
(58) Field of Search .................... 342/378, 382, 342/383

(56) References Cited

U.S. PATENT DOCUMENTS

| | | | |
|---|---|---|---|
| 4,720,712 | * | 1/1988 | Brookner et al. ..................... 342/383 |
| 5,835,487 | * | 11/1998 | Campanella ......................... 370/316 |
| 6,105,060 | * | 8/2000 | Rothblatt .............................. 709/219 |

* cited by examiner

Primary Examiner—Thomas H. Tarcza
Assistant Examiner—Dao L. Phan

(57) ABSTRACT

A method and system for adaptive signal processing for an antenna array reduces the requisite computations for executing an adaptive algorithm that combines or digitally filters baseband receive signals. The system receives uplink electromagnetic signals from a phased array and uplink electromagnetic signals from a diversity array during the reception of a desired electromagnetic signal transmitted by a desired mobile station. The uplink signals are converted into baseband signals for digital signal processing. The baseband signals are observable as a series of successive time slots. The system determines uplink coarse combining weights associated with the uplink baseband signals of the phased array and downlink coarse combining weights associated with the downlink baseband signals of the phased array. The baseband uplink signals are summed into as few as one resultant baseband signal during or after application of the coarse combining weights to the baseband uplink signals. The system determines fine combining weights for one or more resultant baseband signals and the baseband uplink signals on a symbol-by-symbol basis, or on any durational basis less than a time slot, to combine the signals into a single enhanced baseband signal for symbol detection.

24 Claims, 3 Drawing Sheets

METHOD AND SYSTEM FOR ADAPTIVE SIGNAL PROCESSING FOR AN ANTENNA ARRAY

FIELD OF INVENTION

This invention relates to a method and system for adaptive signal processing for an antenna array of a wireless communications system.

BACKGROUND

An adaptive algorithm may be used to improve uplink performance, downlink performance, or both of an antenna array. An adaptive algorithm evaluates reception characteristics of one or more uplink signals to provide guidance in altering signal processing associated with antenna performance. For example, the uplink beam can be filtered or steered toward a direction that provides the best signal-to-noise ratio of the received uplink signals. As an array antenna increases in the number of antenna elements, the processing resources or the processing time required for execution of the adaptive algorithm increases as well. Where an antenna array uses an elaborate adaptive algorithm, overburdened processing resources may respond too slowly to compensate for fading or movement of mobile stations present in a wireless communications system. While greater data processing resources can compensate for a greater number of antenna elements or a more complex adaptive algorithm, the increased manufacturing cost may render such extensive design modifications impractical. Thus, a need exists for reducing the processing resources or processing time associated with execution of an adaptive algorithm for an antenna array.

SUMMARY OF THE INVENTION

In accordance with an embodiment of the invention, a method and system for adaptive signal processing for an antenna array reduces the requisite computations for executing an adaptive algorithm that combines or digitally filters baseband receive signals. The system receives M uplink electromagnetic signals from a phased array and N uplink electromagnetic signals from a diversity array during the reception of an electromagnetic signal transmitted by a mobile station, where M and N have values of positive integers. The M and N uplink signals are converted into baseband signals for digital signal processing. The baseband signals are observable as a series of successive time slots. The system determines M uplink coarse combining weights associated with the uplink baseband signals and M downlink coarse combining weights associated with the downlink baseband signals of the phased array. The M baseband uplink signals are summed into as few as one resultant baseband signal during or after application of the M coarse combining weights to the M baseband uplink signals. The system determines as few as N+1 fine combining weights for the one resultant baseband signal and the N baseband uplink signals on a symbol-by-symbol basis, or on any durational basis less than a time slot, to combine as few as N+1 signals into a single enhanced baseband signal for symbol detection. The enhanced baseband signal is well-suited for decoding because of potential enhancement from diversity gain and interference reduction from the adaptive signal processing.

DETAILED DESCRIPTION OF PREFERRED EMBODIMENTS

Figure 1:
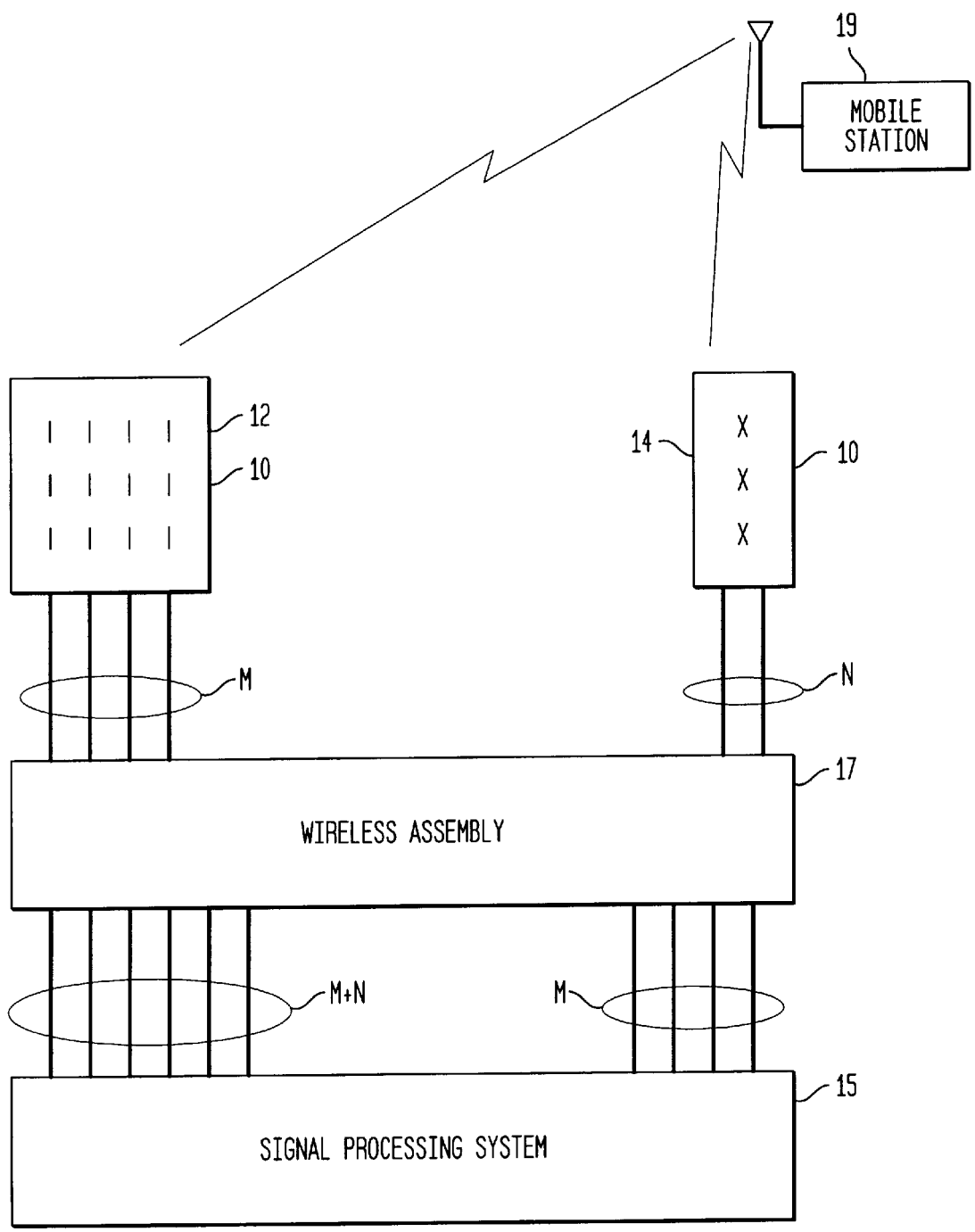
FIG. 1 is a block diagram of a system for signal processing coupled to an antenna array in accordance with the invention.

In accordance with an embodiment of the invention, FIG. 1 shows an antenna array 10 coupled to a wireless assembly 17. The antenna array 10 includes a phased array 12 and a diversity array 14 spaced apart from the phased array 12. The wireless assembly 17 provides an interface between electromagnetic signals at radio frequencies or microwave frequencies to baseband signals at lower frequencies. Electromagnetic signals refer to radio frequency signals, microwave frequency signals, or other signals that are higher in frequency than baseband signals. The wireless assembly 17 may also provide duplexing to provide separate transmit signal paths and receive signal paths and amplification of the transmit signal paths and the receive signal paths. The wireless assembly 17 is coupled to a signal processing system 15 for processing baseband signals to enhance performance of downlink and uplink signals between a mobile station 19 and the wireless assembly 17.

Figure 2:
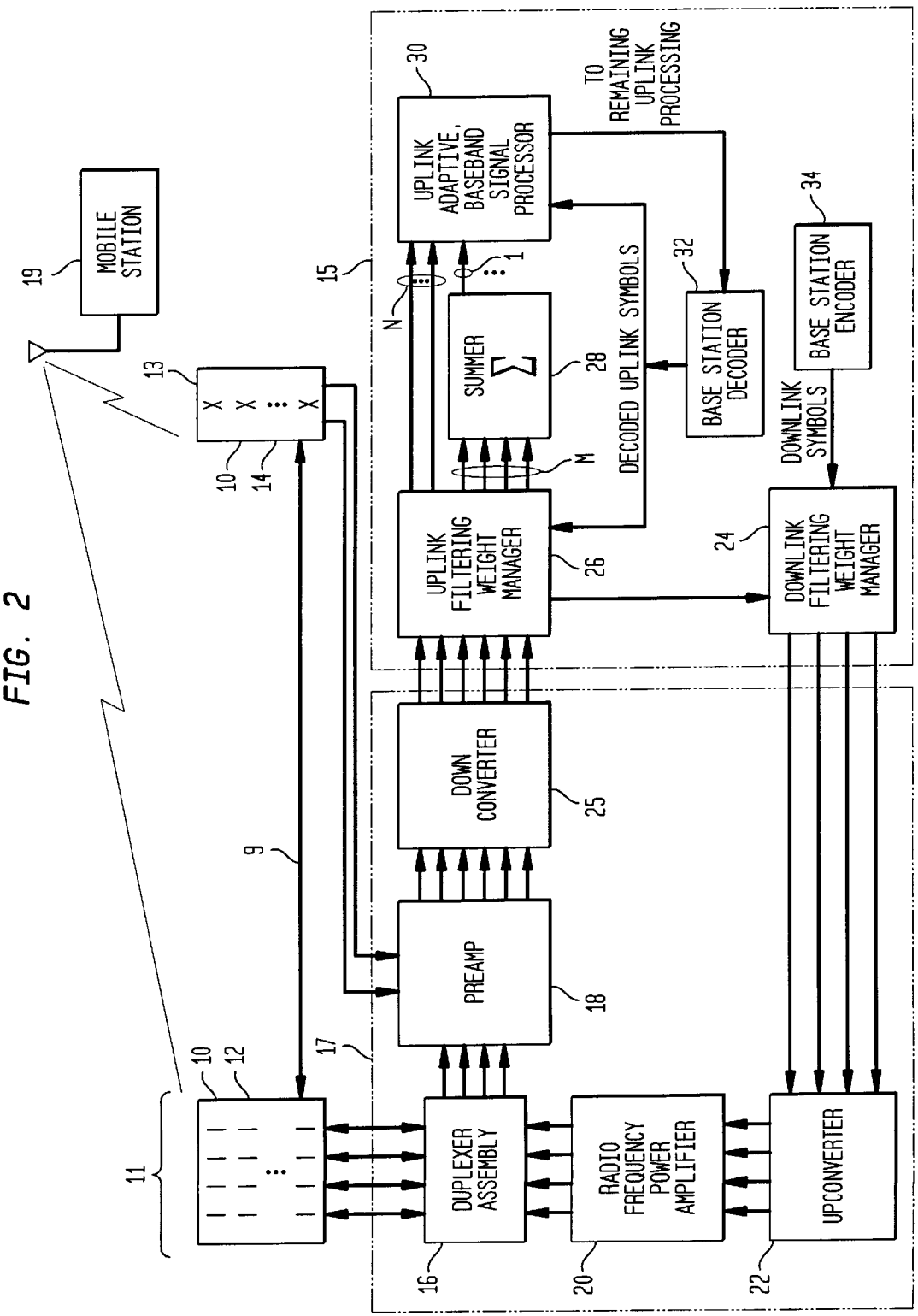
FIG. 2 is a block diagram which shows the system of FIG. 1 in greater detail in accordance with the invention.

FIG. 2 shows an illustrative example of a wireless assembly 17 and a signal processing system 15 in greater detail than FIG. 1. With respect to an uplink signal path, the duplexer assembly 17 is coupled to a preamplifier 18, which is in turn coupled to a downconverter 25. With respect to the downlink signal path, an upconverter 22 is coupled to a radio frequency power amplifier 20, which is in turn coupled to the duplexer assembly 16.

For the uplink signal path, a receive signal received from a desired mobile station 19 is incident upon a phased array 12 and a diversity array 14 of the antenna array 10. The receive signal may also include co-channel interference from other mobile stations. The antenna array 10 and signal processing system 15 facilitate an improved signal-to-interference ratio of the receive signal for the desired mobile station 19 or an improved uplink performance for the desired mobile station 19. The phased array 12 provides M electromagnetic uplink signals from the receive signal and the diversity array 14 provides N electromagnetic uplink signals from the receive signal, where M and N are always greater than zero and where M is preferably greater than N. The M electromagnetic uplink signals from the phased array 12 are fed into the duplexer assembly 16 that communicates with the preamplifier 18, whereas the N uplink signals from the diversity array 14 are directly fed into the preamplifier 18. The preamplifier 18 feeds the downconverter 25 which is coupled to a signal processing system 15.

For the downlink signal path, the signal processing system 15 is coupled to the upconverter 22. In turn, the upconverter 22 is coupled to at least one radio frequency power amplifier 20. The radio frequency power amplifier 20 is coupled to the duplexer assembly 16. The duplexer assembly 16 provides M electromagnetic downlink signals to the phased array 12 for transmission to the mobile station 19.

In one embodiment, the signal processing system 15 includes a data processor for processing software instructions and appropriate hardware interfaces to the wireless assembly 17 such that the interconnections shown in FIG. 2 between an uplink filtering weight manager 26, a summer 28, an uplink adaptive baseband signal processor 30, a downlink filtering weight manager 24, a base station decoder 32, and a base station encoder 34 represent logical communications between the foregoing software instructions. However, in an alternate embodiment, the interconnections shown in FIG. 2 may represent actual electrical interconnections between hardware components of a data processing system.

The signal processing system 15 includes a base station encoder 34 that feeds a downlink filtering weight manager 24. The downlink filtering weight manager 24 is coupled to the upconverter 22. The signal processing system 15 further includes an uplink filtering weight manager 26, a summer 28, and an uplink adaptive baseband signal processor 30.

The downconverter 25 provides an input to the uplink filtering weight manager 26. The uplink filtering weight manager 26 communicates with the summer 28. In turn, the summer 28 is communicates with the uplink adaptive baseband signal processor 30. The uplink baseband signal processor 30 communicates with a base station decoder 32. The base station decoder 32 provides feedback inputs of decoded uplink symbols to the uplink filtering weight manager 26 and the uplink adaptive baseband signal processor 30 to facilitate generation of appropriate coarse combining weights and appropriate fine combining weights, respectively.

Both coarse combining weights and fine combining weights are adaptive or responsive to the dynamic state of a communication signal between the mobile station 19 and the antenna array 10. Coarse combining weights refer to digital filtering weights that are determined on a time slot-by-time slot basis. Coarse combining weights are used to, in effect, shape the uplink radiation pattern of the phased array 12, the downlink radiation pattern of the phased array 12, or both with consideration of a measured uplink signal parameter at the base station decoder 32, such as signal-to-interference ratio or signal-to-noise ratio of an uplink signal transmitted by the mobile station 19. In contrast, fine combining weights signify combining weights that are determined on a temporal duration less than a time slot, such as on a symbol-by-symbol basis. Fine combining weights are used to combine the N+1 uplink baseband signals into a single data stream for symbol detection. The fine combining weights are preferably selected to compensate for fading of the uplink signal or to otherwise enhance the uplink signal reception. Combining weights or filtering weights may include coarse combining weights, fine combining weights, or both.

The antenna array 10 includes a phased array 12 and a diversity array 14. The phased array 12 comprises a matrix of antenna elements (e.g., dipoles or monopoles) arranged into columns 11. The separations between adjacent antenna columns 11 yield a coherent signal response among M antenna ports of the phased array 12 upon reception of a receive uplink electromagnetic signal from a mobile station 19. For example, adjacent columns 11 of the phased array 12 may have a horizontal spacing of less than one wavelength to provide such a coherent signal response. Within a column 11, a vertical spacing of antenna elements may be equal to or less than one-half wavelength, although other suitable vertical spacings fall within the scope of the invention.

During reception, the antenna columns 11 of the phased array 12 interact such that the M electromagnetic uplink signals on the M antenna ports are highly correlated with respect to one another. As used herein, "highly correlated" includes any correlation approaching one, on a scale ranging from one to zero, and lesser correlations that are associated with similar fading responses among the M antenna ports or controllable beam-forming contributions among the M antenna ports. That is, the M electromagnetic uplink signals display similar fading responses as the mobile station 19 moves through a coverage area served by the antenna array 10. During transmission, the antenna columns 11 of the phased array 12 interact such that the M electromagnetic downlink signals on the M antenna ports are highly correlated with respect to one another. Because the columns 11 of the phased array 12 are closely spaced (e.g., less than one-wavelength) in the above manner, the phased array 12 is well-suited for beam-forming or beam-steering applications, and for null-forming or null-steering applications, by varying the phase or the amplitude, among the M baseband signals or through digital signal processing.

The antenna elements within the columns 11 of the phased array 12 may be linearly and vertically polarized, although other polarizations, such as circular, cross-polarization, or otherwise, fall within the scope of the invention. Each column 11 may be center-fed, end-fed, or otherwise fed with a suitable transmission line arrangement (e.g., stripline) such that a single antenna port is generally associated with a corresponding column 11.

The diversity array 14 is separated from the phased array 12 by a separation distance sufficient to provide diversity reception performance. For example, the phased array 12 is preferably horizontally separated from the diversity array 14 within a range of five to twenty wavelengths at the frequency of operation, although other suitable wavelength distances and spatial arrangements fall within the scope of the invention. The phased array 12 and the diversity array 14 are preferably horizontally separated, but the phased array 12 and the diversity array 14 may be vertically separated or both horizontally and vertically separated to provide space-diversity gain.

In one form of the diversity array 14, antenna elements within N columns 13 of the diversity array 14 are preferably diagonally oriented at approximately a forty-five degree angle from a vertical axis. The antenna elements within adjacent columns 13 are preferably orthogonally oriented with respect to each other so as to have the cross-like appearance illustrated in FIG. 2. The N columns 13 provide N corresponding antenna output ports. The antenna elements of the diversity array 14 are preferably cross-polarized, such that the diversity array 14 receives both horizontally polarized and vertically polarized signals in an equivalent manner. In alternative embodiments, the antenna elements of the diversity array may be vertically polarized, circularly polarized, or otherwise configured.

In another form of a diversity array, any adjacent columns of the diversity array are preferably spaced farther apart than the adjacent columns 11 of the phased array 12. For example, the adjacent columns of the diversity array may have a horizontal spacing greater than the horizontal spacing of the adjacent columns of the phased array 12 at the frequency of operation.

In a preferred embodiment, the phased array 12 and the diversity array 14 are used together for reception of an uplink signal from at least one mobile station 19. Further, the phased array 12 alone is preferably used for downlink transmission to the mobile station 19.

The system and method of signal processing may be applied to a time-division, multiple-access (TDMA) system, a global system for mobile communications (GSM), an analog cellular system, a code-division, multiple-access (CDMA) system, or another wireless system. Regardless of the modulation scheme of the wireless system, the signal processing system 15 observes and interacts with the M baseband uplink signals with coarse combining weights on a time slot by-time-slot basis. The time slots observed by the signal processing system 15 may coincide with the underlying time slots associated with the modulation scheme of the wireless system. Each time slot may have a duration that represents the time allotted for the transmission of a group of symbols over a time slot of the particular air interface to facilitate compatibility with base station circuitry or software. For example, the time slot may be assigned a duration of approximately 6.66 milliseconds for a TDMA wireless system in accordance with current TIA/EIA (Telecommunications Industry Association/Electronics Industry Association) IS (International Standard)-136 requirements.

The downconverter 25 converts one or more uplink electromagnetic signals into corresponding baseband uplink signals for signal processing in the signal processing system 15. The uplink filtering weight manager 26 determines M coarse combining weights for the phased array 12 based upon the M converted baseband uplink signals and the decoded uplink symbols.

The uplink filtering weight manager 26 determines M uplink coarse combining weights of earlier observational time slots for later application as M uplink coarse combining weights for subsequent uplink time slots to be decoded by the base station decoder 32. The uplink filtering weight manager 26 may use the observational time slots to facilitate the determination of M downlink coarse combining weights for subsequent downlink time slots. For example, the uplink filtering weight manager 26 may forward M uplink coarse combining weights to the downlink filtering weight manager 24. In one embodiment, the downlink filtering weight manager 24 may apply the forwarded M uplink coarse combining weights to current or subsequent downlink time slots as M downlink coarse combining weights. Alternatively, the downlink filtering weight manager 24 may modify the M uplink coarse combining weights or conduct additional signal processing to determine appropriate M downlink coarse combining weights associated with the corresponding forwarded M uplink coarse combining weights.

Advantageously, the summer 28 sums M baseband signals from the phased array 12 to yield as few as one resultant baseband signal. The uplink adaptive baseband signal processor 30 can use the one resultant baseband signal instead of multiple (i.e., M) baseband signals to reduce the requisite computations and associated requisite processing resources of the uplink adaptive baseband signal processor 30. The baseband signal processor 30 provides uplink fine combining weights for as few as one resultant baseband signal from the summer 28 and N converted baseband signals from the downconverter 25. The baseband signal processor 30 operates on the one resultant baseband signal after application of the M coarse combining weights to predecessor signals of the one resultant baseband signal.

The downlink filtering weight manager 24 applies M downlink coarse combining weights to M downlink baseband signals associated with the phased array 12. The M downlink coarse combining weights are based on the M uplink coarse combining weights from the uplink filtering weight manager 26 as previously described. For any given pair of temporally related downlink and uplink time slots, the M downlink coarse combining weights may coincide with or be identical to the M uplink coarse combining weights of the phased array 12. The upconverter 22 receives the output from the downlink filtering weight manager 24. The upconverter 22 converts one or more processed baseband signals into a radio frequency or microwave frequency for transmission over the phased array 12.

The signal processing system 15 may be incorporated into a base station for use in a wireless communication system. The functions of the signal processing system 15 are readily carried out by one or more dedicated digital signal processors. For example, one digital signal processor may perform the functions of the uplink filtering weight manager 26, the summer 28, the uplink adaptive baseband signal processor 30, and the downlink filtering weight manager 24.

Figure 3:
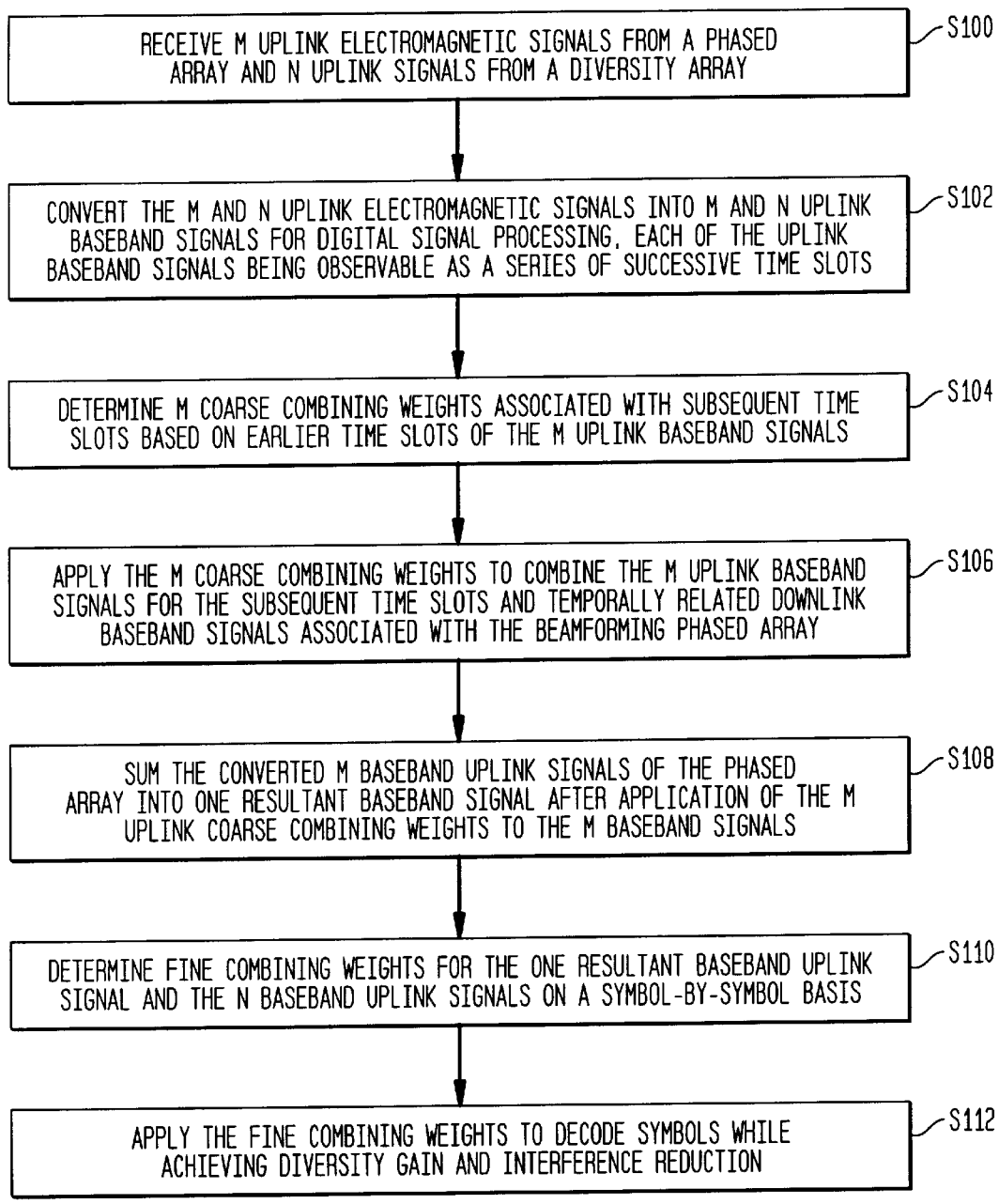
FIG. 3 is a flow chart of a method for signal processing for an antenna array in accordance with the invention.

FIG. 3 illustrates a method and system 15 for adaptive signal processing for an antenna array 10 of FIG. 2. Starting in step S100, the signal processing system 15 receives M uplink electromagnetic signals from a phased array 12 and N uplink radio frequency signals from a diversity array 14, where M and N are greater than zero. As used herein, electromagnetic signals refer to radio frequency signals or microwave frequency signals transmitted by a mobile station 19 in a wireless system. The M uplink electromagnetic signals may be routed through the duplexer assembly 16 and a preamplifier 18 to the signal processing system 15. The N uplink electromagnetic signals may be routed through the preamplifier 18 to the signal processing system 15.

The M signals on the M antenna ports of the phased array 12 do not independently fade with respect to each other because of the close spacing between the adjacent columns 11 facilitates a highly correlated relationship among the M signals. In contrast, the N signals on the N antenna ports of the diversity array 14 fade with less correlation with respect to each other because the N columns 13 of antenna elements are cross polarized with adjacent columns 13 having generally orthogonal polarizations with respect to one other. In an alternate configuration, less correlation between N antenna ports of the diversity array 14 results from the larger spacing between adjacent columns of the diversity array than the close spacing between adjacent antenna columns 11 of the phased array 12.

In step S102, the downconverter 25 converts the M and N received electromagnetic uplink signals into M and N uplink baseband signals, respectively, for digital signal processing. Each digital baseband signal preferably includes an in-phase component and a quadrature component.

Each base band signal is observable as a series of successive observational time slots. An observational time slot includes a plurality of symbols of the modulation scheme transmitted by the mobile station 19. Because coarse combining weights vary slowly over a time slot, computational savings may result from computing one filtering weight per observational time slot, rather than for each of many symbols in a time slot.

In step S104, the signal processing system 15 determines M coarse combining weights for application to the subsequent time slots of the M downlink baseband signals based on earlier time slots of the M uplink baseband signals and feedback on decoded symbols in the earlier uplink time slots. For example, the uplink filtering weight manager 26 determines or facilitates the determination of the M coarse combining weights for subsequent downlink time slots for downlink transmission of the phased array 12.

Coarse combining weights refer to space-time filter parameters that, in effect, may redirect or reshape the beams associated with the M columns of the phased array 12. The above downlink coarse combining weights are preferably based on a mobile station 19 operating on a traffic channel, such as a voice or data channel, as opposed to an access channel which requires sector-wide or omni-directional antenna radiation patterns.

The M coarse combining weights may be applied to subsequent uplink time slots, such as a set of next uplink time slots, from the mobile station 19 over the traffic channel. The M coarse combining weights may be applied to improve both downlink and uplink performance with little more computations involved than determining downlink weights alone. Accordingly, negligible incremental processing is required for converting downlink weights to uplink weights. Indeed, the phased array 12 potentially provides improved performance on the downlink by virtue of the coherent spacing of the columns 11 of the phased array 12.

A time offset, such as one observational time slot, may exist between the determination of a combining weight in step S104 and the application of the determined combining weight to enhance performance of the uplink signal, the downlink signal, or both. The time offset allows the signal processing system 15 sufficient processing time, while providing an adequate response to fading or other propagational changes caused by movement of the mobile station 19 with respect to the antenna array 10. For example, an uplink course combining weight of a prior observational time slot is applied to a subsequent downlink course combining weight and a subsequent uplink course combining weight of a next time slot, where the prior observational time slot immediately precedes the next time slot. However, in alternate embodiments any temporal offset, ranging from one time slot to multiple frames may be used.

The M uplink baseband signals are observable as a series of successive observational time slots in the digital domain and uplink coarse combining weights are assigned to the successive time slots. The downlink and uplink coarse combining weights for the phased array 12 are found by processing each M uplink baseband signal over an observational time slot, are constant in an observational time slot, and vary slowly from one observational time slot to the next owing to changes of mobile angular location and changes in shadow fading.

In step S106 after step S104, the signal processing system 15 applies the M coarse combining weights to combine the M uplink baseband signals for the subsequent time slots and temporally related M downlink baseband signals associated with the phased array 12. The M coarse combining weights are generally applied to subsequent uplink time slots and subsequent downlink time slots. The subsequent uplink time slots are associated with corresponding subsequent downlink time slots which may have some time differential between them because of the standard operation of the air interface. Notwithstanding any time differential, subsequent uplink time slots and subsequent downlink time slots may be grouped as temporally related time slots with similar or identical M coarse combining weights to enhance the performance of the phased array 12.

The M coarse combining weights derived from monitoring the M baseband uplink signals of the phased array 12 for an earlier observational time slot are used for a subsequent time slot, such as the next time slot for the baseband uplink signal of the particular mobile station on the traffic channel. The computed set of M coarse combining weights may be applied to filtering a baseband transmit signal, a baseband receive signal or both after a temporal offset (e.g., one time slot duration offset) between the computation of the set of coarse combining weights and the application of the set of coarse combining weights.

In step S108, the signal processing system 15 sums the converted M baseband uplink signals of the phased array 12 into as few as one resultant baseband signal during or after application of the M coarse combining weights to the M baseband signals. For example, a summer 28 sums the weighted M uplink baseband signals of the phased array 12 into one resultant uplink baseband signal if the M columns 11 of the phased array 12 are closely spaced in a manner that produces a minimum threshold correlation value between pairs of the M received signals on the M antenna ports. Advantageously, the summing operation reduces the signal processing required in the signal processing system 15 to determine fine combining weights or further refine the reception performance of the antenna array 10 by digital filtering operations.

Although the step S106 has been described as providing a single resultant uplink baseband signal for M resultant signals, step S106 could be configured to reduce the number of M uplink baseband signals to less than M and greater than one. The M uplink baseband signals are summed to obtain as few as one uplink filtering weight per each subsequent time slot. The resultant sum represents as few as one uplink baseband signal for the subsequent uplink signal processing, downlink signal processing, or both rather than M uplink baseband signals.

Step S108 prepares the one or more resultant baseband signal for subsequent processing in accordance with any suitable signal processing algorithm (e.g., to provide diversity gain and to reduce co-channel interference). The complexity of the signal processing algorithm may be reduced proportionally to the reduction in the number of input baseband signals to be processed by the signal processing algorithm.

In step S110 in accordance with an adaptive signal processing algorithm, the signal processing system 15 determines fine combining weights for as few as one resultant baseband signal after application of the M coarse combining weights to the M baseband signals. The signal processing system 15 preferably determines fine combining weights for one or more resultant baseband uplink signals (e.g., m uplink signals, where m≧1) and the N baseband uplink signals on a symbol-by-symbol basis based on feedback on decoded symbols, where multiple symbols are associated with each time slot. Thus, the signal processing system 15 may determine N+1 or N+m fine combining weights in step S110, where 1≦m<M. For example, the uplink adaptive baseband signal processor 30 determines fine combining weights that may be used after application of the M uplink coarse combining weights determined by the uplink filtering weight manager 26. The fine combining weights provide a refinement of the signal processing that may provide diversity gain, reduce co-channel interference, or otherwise enhance reception of the signal transmitted by the mobile station 19.

The signal processing system 15 preferably computes a fine combining weight per each symbol within an observational time slot to track the rapidly varying uplink channel and improve the uplink performance, although the fine combining weights may be determined for any duration less than one time slot in length. The fine combining weights may vary rapidly between uplink time slots and even between symbols within the uplink time slots because of the Doppler effect from the movement of the particular mobile station 19. The signal processing system preferably determines fine combining weights on a symbol-by-symbol basis because a symbol duration represents a suitable duration or permissible lag for compensating for fast-fading of the received uplink signal from a mobile station.

In step S112, the processing system 15 applies as few as N+1 fine combining weights determined in step S110 to decode symbols while achieving diversity gain and interference reduction. The antenna array 10 readily provides spatial diversity gain because of the separation between the phased array 12 and the diversity array 14. Further, the antenna array 10 may provide polarization diversity gain if the antenna elements of the phased array 12 and the diversity array 14 have different polarizations. In alternate embodiments, angular diversity between the phased array and the diversity array may enhance reception performance. Improved tolerance to fading may be achieved by the responsiveness of the fine combining weights which are updated as frequently as one symbol to the next.

The signal processing system 15 and the antenna array 10 cooperate to provide spatial selectivity to reduce interference both at the coarse combining weight level and the fine combining weight level. The coarse combining weight level defines, in effect, the general directional aspects of the radiation pattern of the phased array 10 for interference reduction by spatially selecting the desired signal or steering the radiation pattern toward the mobile station 19. Meanwhile, the fine combining weights can be adjusted to filter out interference. The base station decoder 32 recognizes such interference as anomalous decoded symbols that are inconsistent with error checking or the expected output of the enhanced receive baseband signal. Accordingly, the base station decoder 32 indicates the reception of such anomalous decoded symbols, as decoded symbol feedback, to the uplink adaptive baseband signal processor 30. The uplink adaptive baseband signal processor 30 can adaptively tailor the fine combining weights to filter out interference to the desired uplink signal from the mobile station 19. The base station decoder 32 also provides decoded uplink signal feedback to the uplink filtering weight manager 26 for proper selection of the uplink combining weights to determine the preferential virtual steering of the radiation pattern of the phased array 12.

The processing system and method may reduce the requisite processing resources of the uplink adaptive baseband signal processor 30 or facilitate reduced complexity of the adaptive algorithm itself. The signal processing system 15 and method of the invention is well-suited for reducing the number of baseband input signals associated with antenna array 10 by simplifying the number of baseband input signals associated with the phased array 12 with coherently spaced columns.

The uplink adaptive baseband signal processor 30 may execute an adaptive uplink algorithm. The number of computations for an adaptive uplink algorithm operating symbol-by-symbol tends to be proportional to X squared (i.e., $X^2$), where X is based on the total number of antenna elements of the phased array 12 and the diversity array 14. X equals M plus N, where M is the number of columns of the phased array 12 and N is the number of columns 13 of antenna elements of the diversity array 14. Here, the computations may be reduced by segmentation of X into two smaller dimensional sets: (1) a first set of computations for the M columns 11 of the phased array 12 which are executed at a slower time-slot rate and (2) a second set of computations for the N elements 13 of the diversity array 14 which are executed a faster symbol rate faster than the time-slot rate. With M columns 11 in the phased array 12 and N columns in the diversity array 14, an X squared adaptive uplink algorithm can be reduced to an M squared adaptive uplink algorithm (executed at a slow rate) plus an N squared adaptive uplink algorithm (executed at a faster rate).

Thus, the foregoing procedure of FIG. 3 reduces the number of uplink baseband signals to be processed at the symbol rate by the adaptive uplink baseband processor 30 from M+N to as few as 1+N. For example, if the phased array 12 has four columns 11 and the diversity array 14 has two columns, the number of uplink baseband signals to be processed by the adaptive uplink processor 30 is reduced from six to as few as three, or by a factor of one-half. Further, the computational load placed on the adaptive uplink processor 30 may be estimated as $(M+N)^2$. Thus, the computational load on the processing system 15 for uplink adaptive processing is reduced by a factor as much as $[(1+N)/(M+N)]^2$ or by a factor of one-quarter for M equal to four and N equal to two antenna elements. The computational load savings for other configurations of the antenna array 10 depends upon the number of columns 11 of antenna elements of the phased array 12 and the number of columns 13 of antenna elements of the diversity array 14 in accordance with the above mathematical expressions.

If a mobile seeks access to a control channel or if a frame or slot of a traffic channel is corrupted, the signal processing system 15 may need an alternate procedure for computing M coarse combining weights for application to current or subsequent time slots. The processing system 15 computes coarse combining weights from known symbols, such as a synchronizing pilot and color-code symbols present in the uplink signal from the particular mobile station 19 to determine coarse combining weights for a current time slot that are applicable to a subsequent time slot. Alternately, if decoded symbol feedback from a base station is available to the processing system 15, the processing system 15 computes coarse combining weights using all symbols to determine coarse combining weights for application to subsequent time slots.

The specification describes various illustrative embodiments of the system and method of the invention. The scope of the claims is intended to cover various modifications and equivalent arrangements of illustrative embodiments disclosed in the specification. Therefore, the following claims should be accorded the reasonably broadest interpretation to cover modifications, equivalent structures, and features which are consistent with the spirit and scope of the invention disclosed herein.

The following is claimed:

1. A method for signal processing of signals associated with an antenna array; the method comprising:

converting M and N uplink electromagnetic signals from a phased array and a diversity array, respectively, into uplink baseband signals for digital signal processing, the uplink baseband signals being observable as a series of successive time slots, where M and N are positive integers;

applying M coarse combining weights to combine the uplink baseband signals associated with the phased array on a time slot by time slot basis;

summing the weighted M, uplink baseband signals of the phased array into at least one resultant baseband signal; and determining fine combining weights for the at least one resultant uplink signal and the N uplink signals to form a single receive channel for subsequent symbol detection, the fine combining weights applying to a duration less than one of the time slots.

2. The method according to claim 1 further comprising the step of:

receiving the M uplink electromagnetic signals from the phased array and the N uplink signals from the diversity array, the phased array having adjacent columns with separations of less than or equal to one wavelength at the frequency of operation, and the diversity array having cross-polarized antenna elements.

3. The method according to claim 1 further comprising the step of:

receiving the M uplink electromagnetic signals from the phased array and the N uplink signals from the diversity array, the phased array having adjacent columns with separations of less than or equal to one wavelength at the frequency of operation, and the diversity array having greater separations between adjacent columns than the phased array.

4. The method according to claim 1 further comprising the step of:

receiving the M uplink electromagnetic signals from the phased array and the N uplink signals from the diversity array, the phased array being separated from the diversity array within a range from five wavelengths to twenty wavelengths at the frequency of operation.

5. The method according to claim 1 further comprising the step of providing a phased array having separations between adjacent antenna elements that yield a coherent response to a receive signal incident upon the phased array.

6. The method according to claim 1 wherein the determining step comprises determining the fine combining weights on a symbol by symbol basis, wherein multiple symbols are associated with each of the time slots.

7. The method according to claim 1 wherein the applying step further includes applying M downlink coarse combining weights to combine the downlink baseband signals associated with the phased array.

8. The method according to claim 1 wherein the applying step further includes applying M downlink coarse combining weights and M uplink coarse combining weights for subsequent downlink time slots and uplink time slots, respectively, the M coarse combining weights being temporally related to an earlier time slot of an uplink baseband signal.

9. The method according to claim 1 further comprising the step of:

determining the M coarse combining weights for subsequent time slots based on earlier time slots of the uplink baseband signals from the phased array.

10. The method according to claim 1 wherein the applying step further comprises applying M downlink coarse combining weights to subsequent downlink time slots based on analysis of previous uplink time slots of the uplink electromagnetic signals from the phased array.

11. The method according to claim 1 wherein the applying step comprises applying M uplink coarse combining weights, derived from earlier time slots, to subsequent next uplink time slots immediately following the earlier time slots.

12. The method according to claim 1 wherein summing step produces m resultant baseband signals, where m is greater than one and less than M, M is the total number of columns in the phased array, and N is the total number of columns in the diversity array.

13. The method according to claim 1 wherein the summing step includes preparing the uplink baseband signals for application to an adaptive signal processing algorithm by reducing the computational load associated with the adaptive signal processing algorithm by a factor of $(m+N)^2/(M+N)^2$, where M is the total number of columns of antenna elements in the phased array, N is the total number of columns of antenna elements in the diversity array, m is the number of the at least one resultant baseband signal, and $1 \leq m < M$.

14. A method for signal processing of signals associated with an antenna array; the method comprising:

converting the M and N uplink electromagnetic signals from a phased array and a diversity array, respectively, into uplink baseband signals for digital signal processing, the uplink baseband signals being observable as a series of successive time slots;

applying M coarse combining weights to combine the uplink baseband signals associated with the phased array on a time slot by time slot basis; and preparing the uplink baseband signals for application to an adaptive signal processing algorithm by reducing the computational load associated with the adaptive signal processing algorithm by a factor of $(m+N)^2/(M+N)^2$, where M is the total number of columns of antenna elements in the phased array, N is the total number of columns of antenna elements in the diversity array, and m is the number of the at least one resultant baseband signal, and $1 \leq m < M$.

15. The method according to claim 14 further comprising the step of:

determining fine combining weights for the one resultant uplink signal and the N uplink signals to form a single receive channel for subsequent symbol detection, the fine combining weights applying to a duration less than one of the time slots.

16. The method according to claim 14 wherein the preparing step comprises summing the weighted M baseband uplink signals of phased array into as few as one resultant baseband signal.

17. The method according to claim 14 further comprising applying the fine combining weights to decode symbols while achieving diversity gain and interference reduction.

18. A system for signal processing of signals associated with an antenna array; the system comprising:

a downconverter for converting the M and N uplink electromagnetic signals from a phased array and a diversity array, respectively, into uplink baseband signals for digital signal processing, the uplink baseband signals being organized into a plurality of successive time slots;

an uplink filtering weight manager for applying M coarse combining weights for one or more time slots to filter the uplink baseband signals associated with the phased array;

a summer for summing the weighted M baseband uplink signals of phased array into at least one resultant baseband signal; and an uplink adaptive baseband signal processor for determining fine combining weights for the at least one resultant uplink signal and the N uplink signals on a symbol by symbol basis, wherein multiple symbols are associated with each time slot.

19. The system according to claim 18 wherein the phased array has adjacent columns of antenna elements with separations of less than or equal to approximately one-half wavelength at the frequency of operation and the diversity array having cross-polarized antenna elements.

20. The system according to claim 18 wherein the phased array has adjacent columns of antenna elements with separations of less than or equal to one wavelength at the frequency of operation and the diversity array having greater separations between adjacent columns than the phased array.

21. The system according to claim 18 wherein the phased array and the diversity array are separated within a range from five wavelengths to twenty wavelengths at the frequency of operation.

22. The system according to claim 18 wherein the phased array has separations between adjacent antenna elements that yield a coherent response to a receive signal incident upon the phased array.

23. The system according to claim 18 wherein the summer reduces the computational load associated with the adaptive signal processing algorithm by a factor of $(1+N)^2/(M+N)^2$, where M is the total number of columns of antenna elements in the phased array and N is the total number of columns of antenna elements in the diversity array.

24. The system according to claim 18 wherein the summer reduces the computational load associated with the adaptive signal processing algorithm by a factor as small as $(m+N)^2/(M+N)^2$, where M is the total number of columns of antenna elements in the phased array, N is the total number of columns of antenna elements in the diversity array, and m is the number of the at least one resultant baseband signal, and $1 \leq m < M$.

* * * * *